United States Patent Office 3,322,689
Patented May 30, 1967

3,322,689
ISOMERIZATION CATALYSTS AND METHOD OF PREPARATION
Joseph P. Giannetti, Allison Park, Alfred M. Henke, Springdale, Robert E. Kline, Pittsburgh, and Raynor T. Sebulsky, Verona, Pa., assignors to Gulf Research & Development Company, Pittsburgh, Pa., a corporation of Delaware
No Drawing. Filed Aug. 10, 1964, Ser. No. 388,678
16 Claims. (Cl. 252—441)

This invention relates to preparation of novel, low temperature isomerization catalyst compositions and to the use thereof for isomerization of relatively unbranched hydrocarbons to more highly branched forms.

In copending application Ser. No. 358,628, filed in the United States Patent Office on April 9, 1964, in the name of William C. Starnes, there is disclosed and claimed a method of activating composite catalytic materials comprising alumina and a metalliferous hydrogenating component by treatment with a sulfur chloride. It has now been found that the activity of such catalysts can be enhanced by pretreating the catalysts with hydrogen chloride to improve their susceptibility to activation with a sulfur chloride, and that the activity of such catalysts can be still further enhanced by subjecting the pretreated, activated catalysts to a further aftertreatment with hydrogen chloride.

In accordance with the present invention, a composite catalytic material comprising a major proportion of alumina and containing a minor proportion of a metalliferous material having hydrogenating activity such as platinum metal, is activated for isomerization of hydrocarbons by a combination of treating steps involving first, pretreatment of the composite catalyst to improve its susceptibility to activation with a sulfur chloride by contact thereof with hydrogen chloride at a temperature in the range of about 950° to 1250° F., preferably about 1000° to 1100° F., and second, activating the pretreated catalyst by contacting the same with a sulfur chloride at nonreducing conditions at an elevated temperature, for example, 200° to 1000° F., preferably 325° to 800° F., effective to promote a substantial increase in the chlorine content of said composite material. We prefer to employ sulfur oxychlorides, such as thionyl chloride or sulfuryl chloride, as the sulfur chloride utilized in the second mentioned step of the combined activation treatment, but other materials effective to activate alumina catalysts and having the generic formula $S_nO_aX_bY_c$, where S is sulfur, O is oxygen, X is chlorine and Y is a halogen other than chlorine, and $n=1$ or 2, $a=0, 1, 2, 3$ or 5, $b=2, 4$ or 7, $c=0$ or 1, and the sum of $b$ and $c$ is 2 to 8. Examples of such other materials are sulfur monochloride and sulfur dichloride. Composite catalytic materials that have been pretreated and activated in the manner indicated above are highly effective as low temperature isomerization catalysts for paraffinic hydrocarbons, but especially advantageous results are obtained when the above-indicated pretreating and activating treatments are followed by a further activating treatment with hydrogen chloride at a temperature in the range of about 60° to 900° F., preferably about 325° to 800° F. The present invention therefore includes not only the combination of the hydrogen chloride pretreatment activation with a sulfur chloride, and the hydrogen chloride aftertreatment, but also the subcombination of hydrogen chloride pretreatment and activation with a sulfur chloride, as well as catalysts prepared by the indicated combination or subcombination of treating steps, and a method of isomerizing hydrocarbons with catalysts prepared by either the indicated combination or subcombination of treating steps.

The composite catalysts from which the activated catalysts of this invention are derived can comprise any form of porous alumina suitable for use as a catalytic agent or support. For example, excellent results are obtainable with aluminas prepared by calcining a beta-alumina trihydrate such as bayerite or mixtures thereof with other alumina hydrates, but aluminas prepared by calcining other hydrated aluminas, such as the amorphous alumina formed by hydrolysis of aluminum methoxide, or crystallized alumina hydrates, such as alpha-alumina trihydrate or gibbsite, or naturally occurring materials containing the same, such as bauxite, "new" beta-alumina trihydrate or nordstrandite, and alpha- and beta-alumina monohydrate such as boehmite and diaspore, or various combinations of any of these can be used. Also, there can be used the aluminas described in copending patent applications Ser. Nos. 118,240, 118,241 and 118,279, filed June 20, 1961, in the names of William L. Kehl and Meredith M. Stewart, which aluminas are prepared by calcining an alumina hydrate containing 1.2 to 2.6 mols of water of hydration. The alumina bases useful in the present invention can be essentially pure alumina as is preferred, or they can contain small amounts, up to about 45 percent of other refractory oxides, such as silica, beryllia, titania, zirconia or boria. Such aluminas are generally characterized by a high surface area, commonly ranging from about 200 to 500 m.$^2$/g., or even more. Especially advantageous results are obtainable when using aluminas having a surface area above about 250 m.$^2$/g., and more particularly, above 300 m.$^2$/g., although aluminas of lower surface area can be used. Presumably, the amount of chlorine that can be taken up during the sulfur chloride treatment is a function of the surface area that can be contacted thereby, although available experimental evidence indicates that the amount of chlorine taken up is not necessarily limited by surface area.

The catalyst bases or precursors from which the activated catalysts of this invention are prepared are composited with a small proportion of at least one metalliferous component, having hydrogenating activity and selected from the left-hand column of Group VI or from Group VIII of Mendelyeev's Periodic Table. Examples of suitable materials are platinum, rhodium, palladium, nickel and tungsten. Especially good results are obtainable with platinum and palladium. In general, the hydrogenating component will be present in amounts in the range of about 0.01 to 5.0 percent by weight of the catalyst, and preferably about 0.1 to 2.5 percent, particularly in the case of noble metal components. By way of example, excellent results are obtainable with 0.2 and 0.7 percent platinum or 1 percent palladium on alumina.

The hydrogenating component can be composited with the alumina in any convenient way. Thus, the hydrogenating component can be deposited on a precalcined alumina support in the form of a water solution of a water-soluble salt, following which the wetted base can be calcined. Examples of such solutions are solutions containing chloroplatinic acid or other halogen platinum acids, or water solutions of nickel and tungsten nitrate in the desired proportion with respect to one another. Alternatively, the hydrogenating component can be added to the alumina hydrate prior to precipitation with a substance such as hydrogen sulfide and calcining, or calcining alone. Additionally, an aqueous metal sulfide sol, for example, a platinum sulfide sol, can be used to impregnate an alumina hydrate or admixed with an alumina solution prior to drying and calcining.

Regardless of the method of compositing the starting catalyst base, the noble metal hydrogenating components are advantageously converted to a reduced form prior to the pretreatment with hydrogen chloride or the activation treatment with sulfur chloride, so as to minimize loss of the hydrogenating component by formation of volatile complexes during sulfur chloride treatment. In the case of base metals such as nickel and tungsten, the hydrogenating component can remain in the form of a sulfide or oxide prior to the hydrogen chloride pretreatment and the sulfur chloride activation treatment.

It is also important that the hydrogenating component be composited with the alumina base before the hydrogen chloride pretreatment and the sulfur chloride activation treatment, as deposition thereafter normally will result in a reduction of the chlorine content of the sulfur chloride treated base. This is undesirable, as the activity of the herein-disclosed catalyst appears to be generally related to the increase in chlorine content attributable to the sulfur chloride activation treatment.

The catalyst base can contain halogen other than that incorporated by the sulfur chloride treatment. For example, some halogen content may result from the use of an aluminum halide as a starting material to form the alumina base or alternatively, some halogen may remain in the catalyst owing to the use of a halogen-noble metal acid. However, the halogen content from such sources as these does not appear to be equivalent, for purposes of this invention, to the halogen content resulting from the hydrogen chloride and sulfur chloride treatments.

The hydrogen chloride pretreatment of the composite catalytic material can be carried out under any conditions effective to remove at least a portion of the water of hydration not previously removed during calcining and drying of the composite catalytic material and that will not adversely affect the catalytic activity of the catalyst by fusion. Temperatures in the range of about 950° to 1250° F., preferably about 1000 to 1100° F., are normally effective for this purpose. Temperatures significantly less than about 950° F. should not be used for purposes of the present invention, since such lower temperatures are relatively less effective to enhance the susceptibility of the catalyst base to activation with a sulfur chloride. The importance of the pretreating temperature for this purpose has been demonstrated experimentally. Thus, a platinum-alumina catalyst that was pretreated with hydrogen chloride at 1050° F. and thereafter treated with thionyl chloride at a temperature of 560° F. was found to produce about 46 percent conversion of n-butane at a temperature of 350° F., at a pressure of 800 p.s.i.g., a liquid hourly space velocity of 1, and while maintaining a hydrogen to butane mol ratio of 2.5:1. In contrast, pretreatment of the same platinum-alumina reforming catalyst composite with hydrogen chloride at 800° F., followed by activation with thionyl chloride under the same conditions, produced a catalyst which resulted in only 36 percent n-butane conversion at the same isomerization conditions as indicated above. The same degree of n-butane conversion, that is, 36 percent, was also obtained at the same isomerization conditions with a catalyst prepared by treating the same platinum-alumina reforming catalyst with thionyl chloride at 560° F., without any hydrogen chloride pretreatment whatsoever. From these results, it is apparent that hydrogen chloride pretreatments at temperatures significantly below 950° F. are ineffective to improve the susceptibility of the catalytic composite materials disclosed herein to activation with a sulfur chloride.

The hydrogen chloride employed in the pretreating step can be used in any proportion with respect to the composite catalytic material that is effective to increase the chlorine content of such material, as even a small increase in the chlorine content of such material obtained in this fashion will effectively increase the isomerization catalytic activity obtainable by the subsequent treatment with a sulfur chloride. We prefer to employ hydrogen chloride in substantial excess of the amount that is capable of combining with the composite catalytic material at the reaction conditions employed. Excellent results are obtainable by the use of hydrogen chloride in proportions of about 0.1 to 1:1 by weight with respect to the catalyst, but larger or smaller proportions can also be used with good results. The action of the hydrogen chloride upon the composite catalytic material takes place easily at atmospheric pressures, and elevated pressures are not necessary, although such pressures can be used if desired. The hydrogen chloride pretreatment described above, can be carried out for as little as a few minutes, since some hydrogen chloride can combine with the catalyst even when only a small amount of water of hydration is removed from the composite catalytic material, but we prefer to continue the hydrogen chloride treatment until no further evolution of water of hydration can be observed and until no further combination of hydrogen chloride with the catalyst is obtained at the reaction conditions selected. Normally this point will have been reached before about 3 hours at the temperatures indicated, and no further advantage is obtained by longer periods of hydrogen chloride treatment, although we have successfully carried out the pretreatment for as long as 6 hours.

The hydrogen chloride utilized in the pretreating operation need not be pure and can contain other materials that do not adversely affect the isomerization activity of the finished catalyst. In fact, it may be convenient to employ a diluent gas, such as hydrogen, in a ratio of about 1:1 to 10:1 by volume with the hydrogen chloride. Inert diluent gases, such as nitrogen, can also be used in the same or other proportions. Moreover, the hydrogen chloride need not be employed as such but can be introduced in the form of a hydrogen chloride precursor, such as propyl chloride, t-butyl chloride or other chlorine-substituted aliphatic hydrocarbon, when hydrogen is used as the diluent gas.

Any sulfur chloride that is capable of interacting with the composite alumina catalysts disclosed herein to increase the chlorine content thereof and that is effective to activate the same for hydrocarbon isomerization can be used. An example of such a material is thionyl chloride, but other sulfur chlorides of the class having the generic formula $S_nO_aX_bY_c$, where S, O, X, Y, $n$, $a$, $b$ and $c$ are as indicated, can be used. Examples of such other materials are sulfur monochloride, sulfur dichloride, sulfuryl chloride, sulfur trioxytetrachloride, sulfur pentaoxychloride, sulfur monooxytetrachloride, sulfur chloroiodide and sulfur tetrachloride. In general, oxygen-containing sulfur chlorides and sulfur chlorides containing more than one chlorine atom per atom of sulfur are preferred.

As indicated previously, the sulfur chloride treatment of the catalyst base is carried out under nonreducing conditions effective to promote a substantial increase in the chlorine content of the catalyst base. The use of nonreducing conditions is important as reducing conditions may lead to formation of hydrogen chloride, which in turn will reduce the effective amount of chlorine available to combine with the catalyst base. As pointed out above, the chlorine content of the treated catalyst that is attributable to sulfur chloride treatment appears to be related to the activity of the catalyst for purposes of this invention. The nonreducing conditions can be achieved merely by exclusion from the reaction zone of materials other than the catalyst base and the thionyl chloride. Alternatively, the sulfur chloride can be contacted with the catalyst base, together with an inert carrier gas such as nitrogen, or with an oxidizing gas such as air or oxygen. By "nonreducing conditions" is meant merely essentially nonreducing conditions. Accordingly, conditions under which a small proportion of a reducing component such as hydrogen is present are not intended to be excluded.

The sulfur chloride may be contacted with the hydrogen chloride-treated catalyst base in any proportions and under any conditions sufficient to substantially increase the chlorine content of the catalyst base. Proportions sufficient to increase the chlorine content of the catalyst base by about 1 percent under the reaction conditions employed will produce an appreciable improvement in the activity of the catalyst, but we prefer to utilize larger proportions sufficient to increase the chlorine content of the catalyst by at least about 3 and preferably up to about 20 percent by weight. However, still larger proportions can be used; for example, there can be used amounts sufficient to yield up to 30 percent chlorine in the catalyst base without undue difficulties. Within the limits indicated, the use of a sulfur chloride in weight ratios of about 0.02 to 20.0, and preferably about 0.3 to 3 with respect to the catalyst base, are effective at the conditions disclosed herein to achieve the desired results. By way of illustration, examples of weight ratios of thionyl chloride to catalyst that have been used successfully are 0.6:1, 0.3:1, 0.15:1 and 0.09:1.

The sulfur chloride interacts with the catalyst base most readily at elevated temperatures. Very active catalysts are obtained when using treating temperatures in the range of about 325° to 800° F., but higher or lower temperatures can be used. For example, temperatures as low as 200° F. are effective to promote the desired interaction. The treating temperature should not exceed about 1000° F. to avoid unnecessarily reducing the amount of chlorine combined with the catalyst base. Within the temperature ranges disclosed, contact times of about 15 minutes to 5 hours, preferably about 0.5 to 3 hours, are effective to increase the chlorine content of the catalyst base to a satisfactory level for purposes of this invention.

Catalysts activated with a sulfur chloride as indicated are not completely free of sulfur, but chlorine is present in a disproportionate amount with respect to sulfur. Thus, whereas a typical sulfur content of a catalyst prepared in accordance with this invention might be about 0.3 percent by weight, the corresponding chlorine content of such catalyst might be as much as about 3 to 12 percent. While it is presumed that the chlorine interacts chemically in some not fully understood way with the catalyst base, available evidence indicates that the nature of the reaction is unique, as catalysts prepared in the manner disclosed herein have been found markedly superior to comparable catalysts in which the chlorine content of the catalyst is increased, for example, by treatment with vaporous aluminum chloride. When the sulfur content of the activated catalyst is relatively high with respect to the chlorine content, especially when the sulfur chloride activating agent is not an oxygen-containing chloride, as in the case of sulfur monochloride, the activated catalyst is advantageously subjected to an oxidizing treatment with air or oxygen, at conditions that are effective preferentially to reduce the sulfur content, before the activated catalyst is used for isomerization.

The catalyst activated as described above can be used, as such, for low temperature isomerization of paraffinic hydrocarbons, or they may be further subjected to a further activity promoting aftertreatment with hydrogen chloride, as previously indicated.

The hydrogen chloride aftertreatment can be carried out at any conditions that will not significantly reduce the chlorine content of the previously activated catalyst. Temperatures in the range of about 60° to 900° F., preferably in the range of about 325° to 800° F., can be used. While some effect of the hydrogen chloride aftertreatment may be noted at temperatures below 60° F., the temperature of the hydrogen chloride aftertreatment should not be significantly above about 900° F. The importance of the aftertreating temperature has been demonstrated experimentally. Thus, a catalyst produced by high temperature hydrogen chloride pretreatment at 1050° F. for 3 hours with a 4:1 by volume ratio mixture of hydrogen and hydrogen chloride of a commercial platinum reforming catalyst, followed by thionyl chloride treatment at 800° F. of the hydrogen chloride-treated material, followed by a low temperature hydrogen chloride aftertreatment with a 4:1 by volume mixture of hydrogen and hydrogen chloride at 400° F. for 3 hours, was found to contain 3.5 percent chlorine and produced 79 percent isomerization of n-hexane at 200° F., a pressure of 250 p.s.i.g., a liquid hourly space velocity of 1, while maintaining a hydrogen:n-hexane ratio of 2.5:1. In contrast, a catalyst prepared in the same manner, except for hydrogen chloride aftertreatment at a temperature of 1050° F., was found to have a chlorine content of only 2.3 percent and to produce only 17 percent isomerization of n-hexane at 175° F. From these results an n-hexane conversion of less than 40 percent was estimated for this catalyst at 200° F. We prefer to employ the hydrogen chloride in excess of the amount that will combine with the activated catalyst at the conditions of treatment, but smaller amounts can be used. By way of illustration, excellent results are obtainable by the use of hydrogen chloride in proportions of about 0.1 to 1:1 by weight with respect to the activated catalyst.

Similarly as in the case of the hydrogen chloride pretreatment, the hydrogen chloride aftertreatment can be carried out at ambient atmospheric pressures, and elevated pressures are not necessary, although such pressures can be used. Also as in the case of the hydrogen chloride pretreatment, the contact with hydogen chloride can be effected over a period of a few minutes to several hours with good results. If desired, the hydrogen chloride aftertreatment can be carried out before or during contact of the catalyst with a hydrocarbon feed to be isomerized. No significant additional advantages are observed from carrying out the hydrogen chloride aftertreatment beyond 3 hours, although longer treating periods can be used successfully. Further as in the case of the hydrogen chloride pretreatment, the hydrogen chloride need not be pure and may contain as a diluent in any proportion hydrogen gas or inert diluent gases such as nitrogen and the like. By way of illustration, good results are obtainable when hydrogen is employed in proportions of about 1:1 to 10:1 by volume with respect to the hydrogen chloride.

The invention may be best understood by reference to the following specific examples which are illustrative only and are not intended to be limiting as to scope.

*Example 1*

A reforming-type catalyst containing about 0.6 percent platinum and having a surface area on calcining of more than 350 square meters per gram is prepared by precipitating an aqueous aluminum chloride solution with an ammonium hydroxide solution by admixture of equal proportions by volume in a flowing stream at a pH of about 8.0. The resulting precipitate is filtered and washed with distilled water repeatedly to render the precipitate free from chlorides. The washed precipitate is wetted with an excess of water and heated to about 90° F. for several hours. The resulting product is a mixture of hydrated aluminas consisting chiefly of bayerite. This alumina hydrate is slurried with water and aqueous chloroplatinic acid is admixed therewith. The slurry is then mixed with water saturated with hydrogen sulfide, and the pH is reduced to about 6.0 by addition of aqueous ammonium hydroxide. The slurry is then dried, calcined in air at a temperature not exceeding 920° F. and stored. The calcined platinum-alumina composition, in an amount of 126 grams, is again calcined at 550° F. overnight and at 900° F. for 2 hours. It is then reduced in hydrogen at 900° F. for 2 hours. The reduced catalyst is purged with nitrogen and brought up to a temperature of 1050° F. At this temperature, a 4:1 by volume gaseous mixture of hydrogen and hydrogen chloride is passed over the catalyst for 3 hours. The weight ratio of hydrogen chloride to catalyst during this period is about 0.36:1. The rate of hydrogen flow is 1.6 standard cubic feet per hour and the rate of hydrogen chloride flow is 0.4 standard cubic feet per hour. The catalyst is then purged with nitrogen. At the beginning of the hydrogen chloride treatment, the removal of water of hydration not previously removed by calcining can be visually detected on the condensing surfaces of a water cooled condenser. No additional evolution or accumulation of water is observable at the end of the hydrogen chloride treatment.

The temperature of the hydrogen chloride pretreated catalyst is next reduced to 560° F. Thionyl chloride in the total amount of 54 grams is then passed over the catalyst over a period of 45 minutes. At the conclusion of the thionyl chloride addition, the treated catalyst is purged with nitrogen for 2.5 hours, while maintaining the temperature at 550° to 600° F., until no chloride or vaporous chlorides are emitted from the reaction zone.

The hydrogen chloride-pretreated, thionyl chloride-activated catalyst is cooled in a flowing stream of nitrogen to 400° F. At this temperature the flow of nitrogen is discontinued and the activated catalyst is subjected to aftertreatment with hydrogen chloride. This treatment is effected by a 4:1 by volume gaseous mixture of hydrogen and hydrogen chloride over the catalyst for 3 hours, at the rate of 15 grams hydrogen chloride per hour, while maintaining the temperature at 400° F. The total amount of hydrogen chloride passed over the catalyst is 45 grams. The thus-treated catalyst is cooled in a flowing stream of nitrogen to room temperature.

*Example II*

A commercial naphtha reforming catalyst in the amount of about 126 grams containing 0.6 percent platinum on an alumina base, having a typical chlorine content of 0.6 percent chlorine and a typical surface area of about 425 m.$^2$/g. is calcined at 550° F. overnight and at 900° F. for 2 hours. This catalyst is reduced in a stream of hydrogen at 900° F. for 2 hours. The hydrogen flow rate utilized is 1.5 standard cubic feet per hour. The reduced catalyst is purged over a period of 6 hours in a flow of prepurified nitrogen. The temperature of the catalyst is then raised to 1050° F. and the catalyst is subjected to a hydrogen chloride pretreatment, a thionyl chloride activation treatment and a hydrogen chloride aftertreatment, all as described in the preceding example. A catalyst prepared by this method was found to have a chlorine content of 3.5 percent.

Catalysts that have been activated by the combination or subcombination activating processes described herein are useful in the low temperature isomerization of isomerizable saturated hydrocarbons, including not only straight-chain and slightly branched paraffins such as n-butane, n-pentane and n-hexane, but also cycloparaffins such as cyclopentane and cyclohexane and their corresponding methyl- and dimethyl-substituted derivatives. These compounds need not be pure but can be mixed with other hydrocarbon materials as in the case of fractions obtained by fractional distillation of gasoline and naphtha cuts obtained from crude oils or reforming, for example. The process is especially advantageous for vapor phase isomerization of straight-chain paraffin hydrocarbons containing 4 to 6 carbon atoms. When the isomerization feed stock is derived from crude oil, the sulfur content may be so high as detrimentally to affect the catalyst. In such instances, it may be desirable to desulfurize the feed prior to isomerization in conventional manner, preferably by treatment with a suitable desulfurizing catalyst in the presence of hydrogen at elevated temperature and pressure. Desulfurization is especially important when the hydrogenating metal component of the herein-disclosed catalysts is sensitive to sulfur, as in the case of platinum.

Isomerization of the herein-disclosed feed stocks with the herein-disclosed catalysts is carried out at low temperatures in the range of about 150° to 450° F. in the presence of hydrogen gas at a pressure of atmospheric to 2000 p.s.i.g., preferably about 50 to 1200 p.s.i.g., using a hydrogen:hydrocarbon mol ratio in the range of about 0 to 10:1, preferably about 0.1 to 5:1. Space velocities of about 0.3 to 10 and preferably 0.5 to 5 volumes of liquid feed per hour per volume of catalyst can be used in continuous processes. The hydrogen is effective to saturate unsaturated bonds and to suppress cracking. The desired hydrogen:hydrocarbon ratio and hydrogen pressure are advantageously maintained in a continuous process by recycling gases separated from the isomerized hydrocarbon product.

The advantages of the herein-disclosed catalysts and isomerization process have been demonstrated by experimental tests.

EXAMPLE III

In a specific embodiment, a continuous run was carried out using the catalyst of Example II. The feed stock employed in this run was n-hexane. The run was carried out at a reaction temperature of 200° F., at a reaction pressure of 250 p.s.i.g., at a hydrogen:hydrocarbon mol ratio of 2.5:1, and at a space velocity of one volume of liquid hydrocarbon feed per hour per volume of catalyst. The n-hexane feed stock was found to have been converted in the amount of 79 percent to other materials, chiefly dimethyl butanes and methyl pentanes.

To demonstrate the importance of the hydrogen chloride pretreatment and aftertreatment, a catalyst was prepared as described in Example II, except that the hydrogen chloride pretreatment and aftertreatment were omitted. The catalyst prepared in this manner was then utilized to isomerize n-hexane as described in Example III, except that a reaction temperature of 225° F. was utilized. Conversion of n-hexane was found to be about 87 percent. From this value, it is estimated that the conversion of n-hexane at 200° F., the temperature employed in Example II, would have been approximately 60 percent.

EXAMPLE IV

Another catalyst was prepared as described in Example II except that the hydrogen chloride aftertreatment was omitted. This catalyst was then employed to isomerize n-hexane at the conditions described in Example III. Conversion of n-hexane was found to amount to 68 percent.

From a comparison of the results obtained in Examples III and IV with those obtained in the run where both hydrogen chloride treatments were omitted, it will be seen that catalysts that have been promoted by hydrogen chloride pretreatment prior to activation with a sulfur chloride are substantially more active than catalysts activated with a sulfur chloride only, and that catalysts that are first promoted for activation with a sulfur chloride by means of a hydrogen chloride pretreatment and that are then subjected to a hydrogen chloride aftertreatment are substantially more active for purposes of the present invention then either catalysts that have been activated solely with a sulfur chloride or catalysts that have been activated with a sulfur chloride following a hydrogen chloride pretreatment.

EXAMPLE V

A catalyst was prepared as in Example II and employed to isomerize n-butane at a temperature of 350° F., a pressure of 800 p.s.i.g., a liquid hourly space velocity of 1, and a hydrogen:hydrocarbon ratio of 2.5:1. The catalyst was found to produce an n-butane conversion of 53 percent.

EXAMPLE VI

A catalyst was prepared as in Example IV and employed to isomerize n-butane at the conditions indicated in Example V. A conversion of 46 percent was obtained.

The same n-butane stock used in Examples V and VI was isomerized at the conditions specified in Examples V and VI, using a catalyst prepared as described in Example II, except that the hydrogen chloride pretreatment and aftertreatment were omitted. A conversion of only 35 percent was obtained.

We claim:
1. The method of activating a composite catalyst comprising a major proportion of alumina and containing a minor proportion of a metalliferous material having hydrogenating activity, where the metal component of said metalliferous material is selected from the group consisting of metals of Group VIII and the left-hand column of Group VI of the Mendelyeev Periodic Table, comprising pretreating said composite material to improve its susceptibility for activation with a sulfur chloride by contacting the same with hydrogen chloride at a temperature in the range of about 950° to 1250° F., activating the pretreated catalyst by contacting the same with a sulfur chloride having the generic formula $S_nO_aX_bY_c$, where S is sulfur, O is oxygen, X is chlorine, Y is a halogen other than chlorine, $n$ is 1 or 2, $a$ is 0, 1, 2, 3 or 5, $b$ is 2, 4 or 7, $c$ is 0 or 1 and the sum of $b$ and $c$ is 2 to 8, said contacting being carried out at nonreducing conditions at an elevated temperature in the range of about 205° to 1000° F. that is effective to promote a substantial increase in the chlorine content of the catalyst, further promoting the activity of the pretreated, activated catalyst by subjecting the same to an aftertreatment with hydrogen chloride at a temperature in the range of about 60° to 900° F.

2. The method of claim 1 where the sulfur chloride is an oxygen-containing chloride having more than one atom of chlorine per molecule.

3. The method of claim 1 where the sulfur chloride is thionyl chloride.

4. The method of claim 1 where the metalliferous material is platinum in reduced form.

5. The method of claim 1 wherein the alumina has a surface area of more than 250 square meters per gram.

6. The method of activating a composite catalyst comprising a major proportion of alumina and containing a minor proportion of a metalliferous material having hydrogenating activity, where the metal component of said metalliferous material is selected from the group consisting of metals of Group VIII and the left-hand column of Group VI of the Mendelyeev Periodic Table, comprising pretreating said composite catalyst to improve its susceptibility to activation with thionyl chloride by contacting the same with an excess of hydrogen chloride at a temperature in the range of about 950° to 1250° F. for a period in the range of about a few minutes to 6 hours and sufficient at the temperature of treatment to effect removal of water of hydration from the catalyst, activating the pretreated catalyst by contacting the same with thionyl chloride using a thionyl chloride:catalyst weight ratio of about 0.02 to 20:1, at nonreducing conditions, and at an elevated temperature in the range of about 200° to 1000° F. that is effective to promote a substantial increase in the chlorine content of the composite catalyst, for a period of about 15 minutes to 5 hours, further promoting the activity of the pretreated, activated catalyst by subjecting the same to an aftertreatment with an excess of hydrogen chloride at a temperature in the range of about 60° to 900° F. for a period in the range of about a few minutes to 6 hours and insufficient at the temperature of aftertreatment to substantially reduce the chlorine content of the catalyst.

7. The method of activating a composite catalyst comprising a major proportion of alumina and containing a minor proportion of platinum in reduced form, comprising pretreating said composite catalyst to improve its susceptibility to activation with thionyl chloride by contacting the same with a mixture of hydrogen and hydrogen chloride in a volume ratio of about 1:1 to 10:1 at a temperature in the range of about 1000° to 1100° F., where the weight ratio of hydrogen chloride to catalyst is about 0.1:1 to 10:1, for a period in the range of about a few minutes to 3 hours and that is sufficient at the temperature of treatment to effect removal of water of hydration from the catalyst, activating the pretreated catalyst by contacting the same with thionyl chloride using a thionyl chloride:catalyst weight ratio of about 0.03 to 3:1, at nonreducing conditions, and at an elevated temperature in the range of about 200° to 1000° F. that is effective to promote a substantial increase in the chlorine content of the composite catalyst, for a period of about 0.5 to 3 hours, further promoting the activity of the pretreated, activated catalyst by subjecting the same to an aftertreatment with a mixture of hydrogen and hydrogen chloride in a volume ratio of about 1:1 to 5:1 at a temperature in the range of about 325° to 800° F., where the weight ratio of hydrogen chloride to catalyst is about 0.1:1 to 10:1, for a period in the range of about a few minutes to 3 hours and that will not substantially reduce the chlorine content of the catalyst at the temperature of aftertreatment.

8. The method of activating a composite catalyst comprising a major proportion of alumina and containing a minor proportion of a metalliferous material having hydrogenating activity, where the metal component of said metalliferous material is selected from the group consisting of metals of Group VIII and the left-hand column of Group VI of the Mendelyeev Periodic Table, comprising pretreating said composite material to improve its susceptibility for activation with a sulfur chloride by contacting the same with hydrogen chloride at a temperature in the range of about 950° to 1250° F., activating the pretreated catalyst by contacting the same with a sulfur chloride having the generic formula $S_nO_aX_bY_c$, where S is sulfur, O is oxygen, X is chlorine, Y is a halogen other than chlorine, $n$ is 1 or 2, $a$ is 0, 1, 2, 3 or 5, $b$ is 2, 4 or 7, $c$ is 0 or 1 and the sum of $b$ and $c$ is 2 to 8, said contacting being carried out at nonreducing conditions at an elevated temperature in the range of about 200° to 1000° F. that is effective to promote a substantial increase in the chlorine content of the catalyst.

9. The method of activating a composite catalyst comprising a major proportion of alumina and containing a minor proportion of a metalliferous material having hydrogenating activity, where the metal component of said metalliferous material is selected from the group consisting of metals of Group VIII and the left-hand column of Group VI of the Mendelyeev Periodic Table, comprising pretreating said composite catalyst to improve its susceptibility to activation with thionyl chloride by contacting the same with an excess of hydrogen chloride at a temperature in the range of about 950° to 1250° F. for a period in the range of about a few minutes to 6 hours and sufficient at the temperature of treatment to effect removal of water of hydration from the catalyst, activating the pretreated catalyst by contacting the same with thionyl chloride using a thionyl chloride:catalyst weight ratio of about 0.02 to 20:1, at nonreducing conditions, and at an elevated temperature in the range of about 325° to 1000° F. that is effective to promote a substantial increase in the chlorine content of the composite catalyst, for a period of about 15 minutes to 5 hours.

10. The method of activating a composite catalyst comprising a major proportion of alumina and containing a minor proportion of platinum in reduced form, comprising pretreating said composite catalyst to improve its susceptibility to activation with thionyl chloride by contacting the same with a mixture of hydrogen and hydrogen chloride in a volume ratio of about 1:1 to 10:1 at a temperature in the range of about 1000° to 1100° F., where the weight ratio of hydrogen chloride to catalyst is about 0.1:1 to 10:1, for a period in the range of about a few minutes to 3 hours and that is sufficient at the temperature of treatment to effect removal of water of hydration from the catalyst, activating the pretreated catalyst by contacting the same with thionyl chloride using a thionyl chloride:catalyst weight ratio of about 0.03 to 3:1, at nonreducing conditions, and at an elevated temperature in the range of about 200° to 1000° F. that is effective to promote a substantial increase in the chlorine content of the composite catalyst for a period of about 0.5 to 3 hours.

11. A low temperature isomerization catalyst comprising a major proportion of alumina and containing a minor proportion of a metalliferous material having hydrogenating activity, where the metal component of said metalliferous material is selected from the group consisting of metals of Group VIII and the left-hand column of Group VI of the Mendelyeev Periodic Table, which has been prepared by the process of claim 1.

12. A low temperature isomerization catalyst comprising a major portion of alumina and containing a minor proportion of a metalliferous material having hydrogenating activity, where the metal component of said metalliferous material is selected from the group consisting of metals of Group VIII and the left-hand column of Group VI of the Mendelyeev Periodic Table, which has been prepared by the process of claim 8.

13. A method of activating a composite catalyst comprising a major proportion of alumina and containing a minor proportion of a metalliferous material having hydrogenating activity, where the metal component of said metalliferous material is selected from the group consisting of metals of Group VIII and the left-hand column of Group VI of the Mendelyeev Periodic Table, comprising pretreating said composite material to improve its susceptibility for activation with a sulfur chloride by contacting the same with hydrogen chloride at a temperature in the range of about 950° to 1250° F., activating the pretreated catalyst by contacting the same with a sulfur chloride selected from the group consisting of thionyl chloride, sulfur monochloride, sulfur dichloride and sulfuryl chloride, said contacting being carried out at nonreducing conditions at an elevated temperature in the range of about 200° to 1000° F. that is effective to promote a substantial increase in the chlorine content of the catalyst, further promoting the activity of the pretreated, activated catalyst by subjecting the same to an aftertreatment with hydrogen chloride at a temperature in the range of about 60° to 900° F.

14. The process of claim 13 where said metalliferous material is a platinum group metal.

15. A method of activating a composite catalyst comprising a major proportion of alumina and containing a minor proportion of a metalliferous material having hydrogenating activity, where the metal component of said metalliferous material is selected from the group consisting of metals of Group VIII and the left-hand column of Group VI of the Mendelyeev Periodic Table, comprising pretreating said composite material to improve its susceptibility for activation with a sulfur chloride by contacting the same with hydrogen chloride at a temperature in the range of about 950° to 1250° F., activating the pretreated catalyst by contacting the same with a sulfur chloride selected from the group consisting of thionyl chloride, sulfur monochloride, sulfur dichloride and sulfuryl chloride, said contacting being carried out at nonreducing conditions at an elevated temperature in the range of about 200° to 1000° F. that is effective to promote a substantial increase in the chlorine content of the catalyst.

16. The process of claim 15 where said metalliferous material is a platinum group metal.

References Cited
UNITED STATES PATENTS

| | | | |
|---|---|---|---|
| 2,785,138 | 3/1957 | Milliken | 252—415 |
| 3,218,267 | 11/1965 | Goble et al. | 260—683.68 |
| 3,242,228 | 3/1966 | Riordan et al. | 260—683.68 |

OTHER REFERENCES

Moeller, Inorganic Chemistry, pp. 519–520, John Wiley & Sons, New York, 1952.

DELBERT E. GANTZ, *Primary Examiner.*

R. H. SHUBERT, *Assistant Examiner.*

UNITED STATES PATENT OFFICE
CERTIFICATE OF CORRECTION

Patent No. 3,322,689                 May 30, 1967

Joseph P. Giannetti et al.

It is hereby certified that error appears in the above numbered patent requiring correction and that the said Letters Patent should read as corrected below.

Column 9, line 19, for "205°" read -- 200° --.

Signed and sealed this 2nd day of January 1968.

(SEAL)
Attest:

Edward M. Fletcher, Jr.                EDWARD J. BRENNER

Attesting Officer                    Commissioner of Patents